United States Patent [19]

Nishizawa et al.

[11] Patent Number: 4,794,034
[45] Date of Patent: Dec. 27, 1988

[54] WATER ABSORBING ARTICLE

[75] Inventors: Kazunori Nishizawa, Funabashi; Osamu Ito; Iwao Miyashita, both of Utsunomiya, all of Japan

[73] Assignee: Kao Soap Co., Ltd., Tokyo, Japan

[21] Appl. No.: 374,111

[22] Filed: May 3, 1982

[30] Foreign Application Priority Data

May 18, 1981 [JP] Japan ................... 56-74716

[51] Int. Cl.⁴ .................. A41B 13/02; A61F 13/16
[52] U.S. Cl. .................... 428/218; 428/409; 604/312
[58] Field of Search ............... 604/372; 428/409, 218

[56] References Cited

U.S. PATENT DOCUMENTS 4,077,410  3/1978  Butterworth et al. ......... 604/372 X
4,102,340  7/1978  Nesek et al. .............. 604/372 X Primary Examiner—Nancy A. B. Swisher
Attorney, Agent, or Firm—Flynn, Thiel, Boutell & Tanis

[57] ABSTRACT

A sanitary, liquid-absorbing article has as surface material a non-woven fabric comprising two layers integrated by a binder, the first layer having a basis weight of 5 to 15 g/m², the second layer having a basis weight of 20 to 45 g/m², wherein when the non-woven fabric is in the wet state, $E = K\rho_F{}^a$; $\rho_{FO} \leq 1.2 \times 10^{-2}$ g/cm³; and $K \geq 1.2 \times 10^6$ as defined in the following compression characteristic formula of the non-woven fabric:

$$\rho_F = \rho_{FO}[1 + \{(a-1)P/(K\rho_{FO}^a)\}]^{\frac{1}{a-1}}$$

wherein E is a Young's modulus (g/cm²), P is a pressure (g/cm²), $\rho_F$ is an apparent specific weight (g/cm³) and $\rho_{FO}$ is a $\rho_F$ value when the pressure is 0 g/cm².

18 Claims, 1 Drawing Sheet

WATER ABSORBING ARTICLE

The present invention relates to a water-absorbing article. More particularly, the present invention relates to a water-absorbing article in which the surface material is improved.

Figure 1:
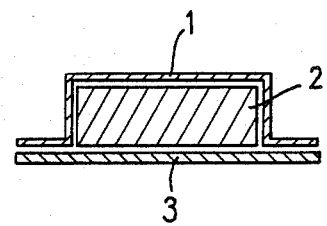
FIG. 1 is a sectional view showing a water-absorbing article.

Water-absorbing articles such as disposable diapers are widely used at the present. Such a water-absorbing article comprises, as shown in FIG. 1, a surface layer or sheet 1, an absorbing layer 2 and a leakage-preventing backing layer or sheet 3, which are arranged in this order from the side which is in contact with the skin when the diaper is worn and are joined with one another, and which further comprises tape, rubber and the like attached to the above assembly to facilitate wearing.

The roles of the respective layers cannot be discussed strictly independently. Ordinarily, however, the surface layer 1 is used to prevent the absorbing layer 2 located below the surface layer 1 from sticking to the skin of the wearer during wearing due to breakage of the article, or to prevent the article from separating into the respective layers. Moreover, the surface layer 1 exerts functions of inhibiting the body fluid absorbed in the absorbing layer from returning to the skin (so-called wet-back phenomenon) and improving the touch to the skin. A non-woven fabric is ordinarily used for the surface layer 1. As the absorbing layer 2, there is ordinarily used a layer formed by compressing a fluff pulp composed of conifer pulp fibers to have a density 0.06 to 0.1 g/cm³. Super absorbing polymers have recently been developed in the field of the polymer chemistry which has made prominent progress, and some of these polymers are used as the material of the absorbing layer. A low-density polyethylene film is ordinarily used as the leakage-preventing layer 3.

In a water-absorbing article formed by fluffing and joining together these layers, the surface material constituting the surface layer is very important, and first of all, this surface material is required to have a soft touch. In known non-woven fabrics, in order to produce a soft touch, there is adopted a method in which the fineness of the constituent fibers is reduced to a level as fine as possible to impart a smooth touch. According to this method, synthetic fibers having a fineness of, for example, 0.5 denier are used. However, it is difficult to manufacture a non-woven fabric of such fine fibers stably by a known non-woven fabric-preparing machine, and a satisfactory non-woven fabric cannot be provided according to this method. Furthermore, this method is disadvantageous from the economic viewpoint. As another method, there can be mentioned a method in which the basis weight of a non-woven fabric is reduced so as to produce a soft touch. However, the basis weight is limited to 15 g/m² from the economic viewpoint of manufacturing. If the basis weight is smaller than this critical value, the web becomes uneven and the strength is drastically reduced.

Accordingly, as a known technique applicable in practice for attaining the effect of preventing the body fluid held in the absorbing layer from returning to the skin of a wearer, there can be mentioned a method in which constituent fibers are rendered hydrophobic as much as possible and the wet characteristics of the surfaces of the fibers are adjusted by using a surface active agent or the like, and a method in which deep convexities and concavities are formed on a non-woven fabric to reduce the area falling in contact with the skin, whereby the wet-back phenomenon is controlled. According to each of these methods, the surface material is improved over the conventional surface materials, but the improvement is not satisfactory. There also is known a method in which a layer having a certain compressive elasticity is formed between the conventional non-woven fabric surface material and the absorbing layer to improve the touch and control the wet-back phenomenon. This method, however, is not satisfactory in practice. More specifically, although rayon fibers are used for the known layer having a certain compressive elasticity and a substantial thickness in, for example, a sanitary napkin or the like, the compressive elasticity of the rayon fibers is drastically reduced in the wet state and no satisfactory results can be obtained. A method in which polypropylene or polyester fibers are used instead of such rayon fibers has been proposed. In this case, reduction of the compressive elasticity in the wet state is not so conspicuous, but the inherent compressive elasticity is low and no satisfactory results can be obtained.

We made researches with a view to eliminating the foregoing defects of the conventional water-absorbing articles, and we have now completed the present invention. More specifically, in accordance with the present invention, there is provided a water-absorbing article having the structure shown in FIG. 1 of which the surface sheet material is a non-woven fabric comprising two layers joined by a binder, wherein the basis weight of the first layer of the non-woven fabric is 5 to 15 g/m², the basis weight of the second layer of the non-woven fabric is 20 to 45 g/m², and when the non-woven fabric is in the wet state, the values of $\rho_{FO}$ and K in the following compression characteristics formula of the non-woven fabric are in the ranges of $\rho_{FO} \leq 1.2 \times 10^{-2}$ g/cm³ and $K \geq 1.2 \times 10^6$, respectively, in the region where the relation of $E = K\rho_F^a$ is substantially established:

$$\rho_F = \rho_{FO}[1 + \{(a-1)P/(K\rho_{FO}^a)\}]^{\frac{1}{a-1}}$$

wherein E stands for the Young's modulus (g/cm²), P stands for the pressure (g/cm²), $\rho_F$ stands for the apparent specific weight (g/cm³) (the $\rho_F$ value in the wet state does not include the weight of water) and $\rho_{FO}$ stands for the $\rho_F$ value when the pressure is 0 g/cm².

Figure 2:
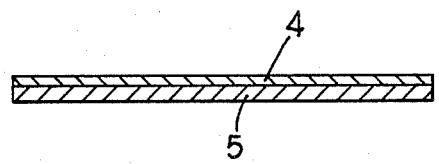
FIG. 2 is a sectional view showing a non-woven fabric used for a water-absorbing article according to the present invention.

As shown in FIG. 2, the non-woven fabric used in the present invention comprises two layers 4 and 5. This non-woven fabric comprises a surface portion 4 and a compressive elastic portion 5, but in the present invention, the non-woven fabric may comprise three or more sub-layers of webs piled by passing them trough a plurality of carding machines.

In the present invention, by effecting bonding of synthetic fibers of polypropylene, polyester or the like by using a binder, the compressive elasticity in either the dry or wet state is improved and satisfactory results can be obtained. According to this technical idea, attainment of the same effect would be expected if a foam layer having interconnecting cells is formed as a layer having a compressive elasticity and a substantial thickness. In this case, however, a compressive elastic layer should additionally be formed for the surface material, and since the final product is a disposable product, this method is disadvantageous from the economic viewpoint and the manufacturing process becomes complicated. In contrast, according to the present invention, by integrally forming the non-woven fabric used as the surface portion with the compressive elastic layer, it is made possible to change the basis weight of the surface non-woven fabric portion 4 to a basic weight in the range of 5 to 12 g/m² from the conventional basis weight of 20 to 30 g/m². The present invention is advantageous also in the effect of improving the strength. In case of the conventional non-woven fabric, if the tensile strength in the lateral direction of the water-absorbing article is not higher than 250 g/25 mm, especially 350 g/25 mm, the non-woven fabric is often broken while the article is being used, and even if the surface material and the compressive elastic layer are independently formed, the above-mentioned tensile strength is similarly required. In contrast, if the above-mentioned integral forming is adopted according to the present invention, since the basis weight of the surface portion can be reduced to 5 to 15 g/m², even if the tensile strength is reduced to 130 g/25 mm, in practice the surface portion is not broken at all. Furthermore, reduction of the basis weight, that is, the thickness of the surface portion 4, results in improvement of the touch. In order to further improve the touch and feel, it is preferred that the surface portion 4 be formed of fine fibers having a fineness of 3 deniers or less. It is preferred that the basis weight of the compressive elastic portion be 20 to 45 g/m², especially 25 to 35 g/m². If the basis weight is too large, the above-mentioned characteristic properties can be obtained but such large basis weight is not preferred from the economic viewpoint. The compressive elasticity will now be described. In connection with the compression characteristic of a fiber assembly, the following empirical formula is proposed by Kawano et al [The Journal of The Society of Fiber Machines, 15, 273–277 (1962)]:

$$\rho_F = \rho_{FO} [1 + \{(a - 1)P/K\rho_{FO}^a\}]^{\frac{1}{a-1}}$$

wherein $\rho_F$ stands for the apparent specific weight (g/cm³) of a fiber layer, $\rho_{FO}$ stands for the $\rho_F$ value (g/cm³) when the compressive pressure is 0, P stands for the compressive pressure (g/cm²), a stands for a constant and K stands for a constant (which can be a criterion indicating the compressive elasticity).

The $\rho_{FO}$ and K values are determined according to the following method. More specifically, the basis weight (g/m²) of a sample having a size of 200 mm × 100 mm is measured, and the relation between the compressive force and thickness of the non-woven fabric is measured by a "TENSILON" compression type load cell. A tangential line is drawn on the curve of this relation, and the Young's modulus E is determined from the angle of the tangential line. If the relation between the apparent density $\rho_F$ and the Young's modulus E is plotted on logarithmic graph paper, a straight line of log $E = a \log \rho_F + \log K$ can be obtained. From this line, the K value is obtained.

The $\rho_{FO}$ value is determined from the thickness observed when the pressure is 0. In order to control the wet-back phenomenon in a disposable diaper or the like, the K value indicating the compressive elasticity should be large not only in the dry state but also in the wet state, and the K value should be at least $1.2 \times 10^6$ even in the wet state and it is preferred that the K value be as large as possible. In order to increase the K value in the wet state, hydrophilic fibers of the cellulose type or the like are not preferred, but synthetic fibers are preferred and the K value is increased as the proportion of fibers having a larger size in deniers is increased. For example, it is preferred that the proportion of fibers having a fineness of at least 6 denier be at least 30% in the compressive elastic portion 5. When a web containing at least 25% of synthetic fibers having a fineness of at least 6 denier is fusion-bonded, the a value is substantially constant in the range of 2.92±0.1, and this value is not particularly critical. Even if the compressive elasticity constant K is increased, if the apparent specific weight $\rho_{FO}$ under the compression pressure of 0 is large, the practical apparent specific weight $\rho_F$, that is, the apparent specific weight under the body weight, is also large and voids among fibers are decreased. Therefore, in such case, the quantity of the wet-back fluid is large and the time required for absorption becomes long, with the result that leakage of the body fluid is readily caused. In view of the foregoing, it is preferred that the value $\rho_{FO}$ be smaller than $1.2 \times 10^{-2}$ g/cm³.

When a disposable diaper comprising a non-woven fabric satisfying the above requirements is actually used, it is presumed that a distance of 0.7 to 1.0 mm will be kept between the surface of the hip of the wearer and the absorbing layer in the stationary state. When the wearer sits down on a seat surface which is not flat, the compression pressure is increased and the absorbing material is brought into contact with the skin surface, with the result that the wet-back phenomenon takes place. In view of the foregoing, the K value should be large. The non-woven fabric of the present invention can easily be prepared according to a known method, for example, a method in which two carding machines are used, one being mainly for fibers having a fineness of 3 denier or less and the other being mainly for a web comprising at least 30% of fibers having a fineness of at least 6 denier, and two webs are piled and fusion-bonded by hot air (in the case where ES fibers, which are heat-fusible binder fibers made of conjugated polyethylene and polypropylene supplied by Chisso-Polypro K.K., are used).

As the simpler method, there may be adopted a method in which a web comprising at least 30% of fibers having a fineness of at least 6 denier is piled on a thin non-woven fabric having a basis weight of about 10 g/m² and the two layers are fusion-bonded by hot air.

The present invention will now be described in detail with reference to the following Examples.

Example 1

Surface portion:
ES (heat-fusible binder fiber supplied by Chisso-Polypro K.K.), 3d × 51 mm (fineness of 3 denier × length of 51 mm; the same will apply hereinafter), basis weight = 8 g/m² (on the average)

Compressive elastic portion:
70% of ES, 3d × 51 mm and 30% of PET (polyester fiber), 12d × 51 mm, basis weight = 32 g/m² (on the average)

A non-woven fabric was prepared so that $\rho_{FO}$ was $1.0 \times 10^{-2}$ g/cm$^3$.

Example 2

Surface portion:
Same as in Example 1
Compressive elastic portion:
60% of ES, 3d×51 mm, 40% of PET, 12d×51 mm, basis weight=32 g/m$^2$ (on the average)
$\rho_{FO} = 1.0 \times 10^{-2}$ g/cm$^3$

Example 3

Surface portion:
Same as in Example 1
Compressive elastic portion:
70% of ES, 3d×51 mm, 30% of PET, 6d×51 mm, basis weight=32 g/m$^2$ (on the average)
$\rho_{FO} = 1.0 \times 10^{-2}$ g/cm$^3$

Example 4

Surface portion:
Same as in Example 1
Compressive elastic portion:
60% of ES, 3d×51 mm, 40% of PET, 6d×51 mm, basis weight=32 g/m$^2$ (on the average)
$\rho_{FO} = 1.0 \times 10^{-2}$ g/cm$^3$

Example 5

Surface portion:
Same as in Example 1
Compressive elastic portion:
70% of ES, 3d×51 mm, 30% of PP (polypropylene fiber), 6d×51 mm, basis weight=32 g/m$^2$ (on the average)
$\rho_{FO} = 1.0 \times 10^{-2}$ g/cm$^3$

Example 6

Surface portion:
Same as in Example 1
Compressive elastic portion:
60% of ES, 3d×51 mm, 40% of PP, 6d×51 mm, base weight=32 g/m$^2$ (on the average)
$\rho_{FO} = 1.0 \times 10^{-2}$ g/cm$^2$

Example 7

A non-woven fabric was formed in the same manner as in Example 5 except that the basis weight of the surface portion was changed to 15 g/m$^2$ and the basis weight of the compressive elastic portion was changed to 20 g/m$^2$.

Example 8

A non-woven fabric was formed in the same manner as in Example 5 except that the basis weight of the compressive elastic portion was changed to 40 g/m$^2$.

Example 9

A non-woven fabric was formed in the same manner as in Example 2 except that the $\rho_{FO}$ value was $1.2 \times 10^{-2}$ g/cm$^3$.

Example 10

A non-woven fabric was formed in the same manner as in Example 2 except that the $\rho_{FO}$ value was $0.8 \times 10^{-2}$ g/cm$^3$.

Comparative Example 1

Surface portion:
Same as in Example 1
Compressive elastic portion:
60% of ES, 3d×51 mm, 40% of PET, 3d×51 mm, basis weight=32 g/m$^2$
$\rho_{FO} = 1.0 \times 10^{-2}$ g/cm$^3$

Comparative Example 2

A non-woven fabric was formed in the same manner as in Example 2 except that the $\rho_{FO}$ value was $1.3 \times 10^{-2}$ g/cm$^3$.

Comparative Example 3

A non-woven fabric was formed in the same manner as in Example 2 except that bonding by heat fusion was not performed.

Comparative Example 4

A non-woven fabric was formed in the same manner as in Example 5 except that the basis weight of the compressive elastic portion was changed to 19 g/m$^2$ (on the average) and the $\rho_{FO}$ value was $1.2 \times 10^{-2}$ g/cm$^3$.

Comparative Example 5

Surface portion:
Same as in Example 1
Compressive elastic portion:
75% of ES, 3d×51 mm, 25% of PP, 6d×51 mm, basis weight=32 g/m$^2$
$\rho_{FO} = 1.0 \times 10^{-2}$ g/m$^3$

Comparative Example 6

An ordinary non-woven fabric composed solely of PET and having a basis weight of 15 g/m$^2$ was formed according to the spin-bonding method.

The capacities of the non-woven fabrics formed in Examples 1 through 10 and Comparative Examples 1 through 6 were determined and evaluated according to the following test methods.

Wet-Back Quantity and Absorption Time:

A commercially available pulp fiber was formed into a web having a basis weight of 280 g/m$^2$ and the web was compressed so that the density was 0.1 g/cm$^3$. The compressed web was cut into a specimen having a size of 30 cm×40 cm, an absorbent paper having a basis weight of 20 g/m$^2$ was piled on the specimen and the sample non-woven fabric was piled thereon. Then, 105 cc of physiological saline solution (having a surface tension of 50 dyn/cm) was added to and absorbed by the non-woven fabric in the vicinity of the central thereof, and the absorption time in seconds was measured. After passage of 2 minutes, 10 filter papers No. 4 were piled on the non-woven fabric and a load (10 cm×10 cm) of 35 g/cm$^2$ was applied for 3 minutes. The quantity of the liquid absorbed in the filter papers was measured as the wet-back quantity.

The obtained results are shown in Table 1.

TABLE 1

| | Basis Weight (g/m$^2$) | $\rho_{FO}$ (g/cm$^3$) | K Value | Wet-Back Quantity (g) | Absorption Time (sec) |
|---|---|---|---|---|---|
| Example 1 | 40 | $1.0 \times 10^{-2}$ | $2.9 \times 10^6$ | 0.4 | 27 |
| Example 2 | 40 | " | $3.4 \times 10^6$ | 0.3 | 24 |
| Example 3 | 40 | " | $1.6 \times 10^6$ | 1.1 | 34 |
| Example 4 | 40 | " | $2.2 \times 10^6$ | 0.8 | 30 |
| Example 5 | 40 | " | $1.3 \times 10^6$ | 1.8 | 39 |
| Example 6 | 40 | " | $1.8 \times 10^6$ | 0.9 | 31 |
| Example 7 | 35 | " | $1.2 \times 10^6$ | 1.7 | 42 |
| Example 8 | 48 | " | $1.7 \times 10^6$ | 1.4 | 34 |
| Example 9 | 40 | $1.2 \times 10^{-2}$ | $3.1 \times 10^6$ | 1.1 | 29 |
| Example 10 | 40 | $0.8 \times 10^{-2}$ | $3.7 \times 10^6$ | 0.1 | 23 |

TABLE 1-continued

| | Basis Weight (g/m²) | ρFO (g/cm³) | K Value | Wet-Back Quantity (g) | Absorption Time (sec) |
|---|---|---|---|---|---|
| Comparative Example 1 | 40 | $1.0 \times 10^{-2}$ | $0.8 \times 10^6$ | 4.3 | 46 |
| Comparative Example 2 | 40 | $1.3 \times 10^{-2}$ | $1.9 \times 10^6$ | 2.2 | 67 |
| Comparative Example 3 | 40 | $1.0 \times 10^{-2}$ | $0.25 \times 10^6$ | 6.2 | 90 |
| Comparative Example 4 | 27 | $1.2 \times 10^{-2}$ | $1.1 \times 10^6$ | 3.0 | 51 |
| Comparative Example 5 | 40 | $1.2 \times 10^{-2}$ | $1.1 \times 10^6$ | 2.8 | 54 |
| Comparative Example 6 | 15 | — | — | 7.1 | 113 |

The embodiments of the invention in which an exclusive property or privilege is claimed are defined as follows:

1. In a water-absorbing article including a water-permeable surface sheet, a water-impermeable backing sheet, and a water-absorbing layer disposed between said surface sheet and said backing sheet in face-to-face contact with both of said sheets, the improvement which comprises: said surface sheet comprises a surface layer and an elastic compressible layer, both of said layers consisting essentially of a non-woven fabric, said layers being joined together in face-to-face contact with each other by heat-fusible binder fibers, wherein the basis weight of said surface layer is in the range of 5 to 15 g/m², and the basis weight of said elastic compressible layer is in the range of 20 to 45 g/m², said elastic compressible layer being in face-to-face contact with said water-absorbing layer of said water-absorbing article, and when said surface sheet is in a wet state, the values of $\rho_{FO}$ and K in the compression characteristic formula:

$$\rho_F = \rho_{FO}[1 + \{(a - 1)P/K\rho_{FO}^a\}]^{\frac{1}{a-1}}$$

wherein P is the pressure exerted on said surface sheet in g/cm², $\rho_F$ is the apparent specific weight of said surface sheet in g/cm³ not including the weight of water when said surface sheet is in a wet state, $\rho_{FO}$ is the $\rho_F$ value when the pressure exerted on said surface sheet is 0 g/cm², and a and K are each a constant, are in the ranges of $\rho_{FO} \leq 1.2 \times 10^{-2}$ g/cm³ and $K \geq 1.2 \times 10^6$, under conditions wherein the relation $E = K\rho_F^a$ is substantially established, wherein E is the Young's modulus for said surface sheet in g/cm².

2. A water-absorbing article as claimed in claim 1, wherein said surface sheet has a tensile strength of at least 130 g/25 mm in the lateral direction of the non-woven fabric.

3. A water-absorbing article as claimed in claim 2, wherein said tensile strength is less than 250 g/25 mm.

4. A water-absorbing article as claimed in claim 1, wherein said heat-fusible binder fibers are incorporated into at least one of said layers, whereby said layers can be joined together by bringing said layers into face-to-face contact and applying heat sufficient to fuse said heat-fusible fibers thereto.

5. A water-absorbing article as claimed in claim 1, wherein said non-woven fabric consists essentially of synthetic fibers, at least 30% of said fibers in said elastic layer have a fineness of 6 deniers or more and said surface layer consisting essentially of fibers having a fineness of 3 deniers or less.

6. A water-absorbing article as claimed in claim 5, wherein said synthetic fibers are selected from the group consisting of heat-fusible, conjugated polyethylene and polypropylene fibers, polyester fibers and polypropylene fibers.

7. A water-absorbing article as claimed in claim 6, wherein said layers each consist essentially of said heat-fusible fibers and polyester fibers.

8. A water-absorbing article as claimed in claim 1, wherein the constants a and K are determined by plotting a curve comprising measured values for compressive force corresponding to selected different thickness values of said surface sheet, determining E values by measuring the slope of lines tangent to different points on said curve, plotting calculated E values versus corresponding $\rho_F$ values for said surface sheet logarithmically to obtain a straight line, and then determining a and K for said surface sheet from said straight line according to the equation $\log E = a \log \rho_F + \log K$.

9. A water-absorbing article as claimed in claim 1, wherein said surface layer consists essentially of heat-fusible binder fibers of conjugated polyethylene and polypropylene having a fineness of 3 denier and a length of 51 mm, said surface layer having a basis weight of 8 g/m², said elastic compressible layer consists essentially of 30% of polyester fibers of 12 denier fineness and 51 mm length and 70% of said heat fusible fibers of 3 denier fineness and 51 mm length, said compressive elastic layer having a basis weight of 32 g/m², both said layers being fusion bonded together by hot air and the finished surface sheet having a $\rho_{FO}$ value of $1.0 \times 10^{-2}$ g/cm³ and a K value of $2.9 \times 10^6$.

10. A water-permeable sheet adapted for use as a water-permeable surface sheet in a water-absorbing article, which article includes the water-permeable surface sheet, a water-impermeable backing sheet, and a water-absorbing layer disposed between said surface sheet and said backing sheet in face-to-face contact with both of said sheets, said water-permeable sheet comprising a first layer and a second elastic compressible layer, both of said layers consisting essentially of a non-woven fabric, said layers being joined together in face-to-face contact with each other by heat-fusible binder fibers, wherein the basis weight of said first layer is in the range of 5 to 15 g/m², and the basis weight of said second layer is in the range of 20 to 45 g/m², and when said water-permeable sheet is in a wet state, the values of $\rho_{FO}$ and K in the compression characteristic formula:

$$\rho_F = \rho_{FO}[1 + \{(a - 1)P/K\rho_{FO}^a\}]^{\frac{1}{a-1}}$$

wherein P is the pressure exerted on said water-permeable sheet in g/cm², $\rho_F$ is the apparent specific weight of said water-permeable sheet in g/cm³ not including the weight of water when said surface sheet is in a wet state, $\rho_{FO}$ is the $\rho_F$ value when, the pressure exerted on said water-permeable sheet is 0 g/cm², and a and K are each a constant, are in the range of $\rho_{FO} \leq 1.2 \times 10^{-2}$ g/cm$^3$ and $K \geq 1.2 \times 10^6$, under conditions wherein the relation $E = K\rho_F{}^a$ is substantially established, wherein E is the Young's modulus for said water-permeable sheet in g/cm$^2$.

11. A water-permeable sheet as claimed in claim 10, wherein said water-permeable sheet has a tensile strength of at least 130 g/25 mm in the lateral direction of the non-woven fabric.

12. A water-permeable sheet as claimed in claim 11, wherein said tensile strength is less than 250 g/25 mm.

13. A water-permeable sheet as claimed in claim 11, wherein said heat-fusible binder fibers are incorporated into at least one of said layers, whereby said layers can be joined together by bringing said layers into face-to-face contact and applying heat sufficient to fuse said heat-fusible fibers thereto.

14. A water-permeable sheet as claimed in claim 10, wherein said non-woven fabric consists essentially of synthetic fibers, at least 30% of the fibers in said elastic layer have a fineness of 6 deniers or more and said surface layer consisting essentially of fibers having a fineness of 3 deniers or less.

15. A water-permeable sheet as claimed in claim 14, wherein said synthetic fibers are selected from the group consisting of heat-fusible, conjugated polyethylene and polypropylene fibers, polyester fibers and polypropylene fibers.

16. A water-permeable sheet as claimed in claim 15, wherein said layers each consist essentially of said heat-fusible fibers and polyester fibers.

17. A water-permeable sheet as claimed in claim 10, wherein the constants a and K are determined by plotting a curve comprising measured values for compressive force corresponding to selected different thickness values of said surface sheet, determining E values by measuring the slope of lines tangent to different points on said curve, plotting calculated E values versus corresponding $\rho_F$ values logarithmically to obtain a straight line, and then determining a and K for said surface sheet from said straight line according to the equation $\log E = a \log \rho_F + \log K$.

18. A water-absorbing article as claimed in claim 1, wherein said surface layer consists essentially of heat-fusible binder fibers of conjugated polyethylene and polypropylene having a fineness of 3 denier and length of 51 mm, said surface layer having a basis weight of 8 g/m$^2$ and said compressive elastic portion consists essentially of 40% of polyester fibers of 12 denier fineness and 51 mm length and 60% of said heat fusible fineness fibers of 3 denier fineness and 51 mm length, said compressive elastic portion having a basis weight of 32 g/m$^2$, both said layers being fusion bonded together by hot air and the finished surface sheet having a $\rho_{FO}$ value of $1.0 \times 10^{-2}$ g/cm$^3$ and a K value of $3.4 \times 10^6$.

* * * * *